United States Patent [19]  [11]  4,113,802
Matteoli et al.  [45]  Sep. 12, 1978

[54] PROCESS FOR PREPARING POLYPROPYLENE COMPOSITIONS HAVING HIGH IMPACT STRENGTH AT LOW TEMPERATURES

[75] Inventors: Mario Matteoli; Luciano Luciani, both of Ferrara, Italy

[73] Assignee: Montedison S.p.A., Milan, Italy

[21] Appl. No.: 755,503

[22] Filed: Dec. 29, 1976

Related U.S. Application Data

[63] Continuation-in-part of Ser. No. 631,526, Nov. 13, 1975, abandoned.

[30] Foreign Application Priority Data

Nov. 14, 1974 [IT] Italy ............................ 29436 A/74

[51] Int. Cl.$^2$ ........................................... C08F 297/08
[52] U.S. Cl. ................................................. 260/878 B
[58] Field of Search ..................................... 260/878 B

[56] References Cited

U.S. PATENT DOCUMENTS

| 3,629,368 | 12/1971 | Fukuda et al. | 260/878 B |
| 3,798,288 | 3/1974 | McManimie et al. | 260/878 B |
| 3,970,719 | 7/1976 | Edmonds, Jr. | 260/878 B |
| 3,974,236 | 8/1976 | Koga et al. | 260/878 B |
| 3,998,911 | 12/1976 | Strametz et al. | 260/878 B |

FOREIGN PATENT DOCUMENTS 20,621  9/1969  Japan ................................. 260/878 B Primary Examiner—Alan Holler

[57] ABSTRACT

There is disclosed a new and improved process for preparing compositions consisting for at least 50% by weight of isotactic polypropylene and having high impact strength at low temperatures.

The process comprises three or more steps. In the first step propylene is polymerized in an inert liquid hydrocarbon medium and in contact with a stereospecific catalyst prepared by mixing a titanium trihalide with a dialkyl aluminum monohalide to obtain a slurry. In subsequent steps ethylene, or an ethylene/propylene mixture, is fed to the polymerization suspension of first step and the polymerization is continued until the amount of ethylene polymerized is, at most, 20% by weight of the total, final polymeric composition obtained.

1 Claim, No Drawings

PROCESS FOR PREPARING POLYPROPYLENE COMPOSITIONS HAVING HIGH IMPACT STRENGTH AT LOW TEMPERATURES

This application is a continuation-in-part of our application Ser. No. 631,526, filed Nov. 13, 1975, now abandoned.

BACKGROUND OF THE INVENTION

Isotactic polypropylene, as defined in Natta et al U.S. Pat. No. 3,112,300, is a polypropylene which consists essentially of isotactic macromolecules, i.e., macromolecules having substantially the isotactic structure and being insoluble in (non-extractable with) boiling n-heptane.

While said polypropylene is adapted to use in many commercially important applications, its impact strength at temperatures of 0° C or less is rather low, particularly for socalled commercial grade polypropylene.

Different ways of improving the impact strength of the polypropylene at low temperatures without unacceptable adverse effect on its other properties, including its flexural rigidity and thermal resistance have been proposed.

The technique which is most widely used for achieving that objective consists in polymerizing propylene in contact with a Ziegler/Natta stereospecific catalyst until most of the propylene is polymerized and then, during the final stage of the propylene polymerization feeding a different olefin, in particular ethylene, to the polymerization zone and continuing the polymerization until the amount of the added olefin, e.g., ethylene, polymerized is from 1% to 20% of the total (final) polymeric composition obtained.

U.S. Pat. No. 3,624,184 discloses a typical method which is widely followed. According to that method, propylene is first polymerized in an inert hydrocarbon solvent such as n-heptane and in the presence of a stereospecific polymerization catalyst prepared by mixing a Ti trihalide with a dialkyl Al monohalide to obtain a polymerization slurry, i.e., a suspension of polypropylene in the n-heptane. After "flash-off" of unreacted propylene until the slurry comprises a controlled amount of unreacted propylene, the slurry is preferably transferred to a second reactor, a mixture of ethylene and propylene in a molar ratio ranging, in general, from 1 to 6 is introduced into the second reactor, and the polymerization is continued until the amount of polymerized ethylene reaches a prefixed value which, generally, is from 5% to 20% by weight.

The main disadvantage of that process — which in practice prevents conducting the polymerization continuously and involves many difficulties in batch polymerization — is that during the polymerization of ethylene in the presence of propylene dissolved in the reaction medium, or in the presence of propylene fed in with the ethylene, considerable amounts of rubbery ethylene/propylene copolymers soluble in the reaction medium are formed, which give rise to considerable difficulties in the heat exchange and in transfer of the polymerization slurry.

THE PRESENT INVENTION

One object of this invention is to provide a new method for improving the low-temperature characteristics of the compositions based on isotactic polypropylene which avoids or minimizes the problems encountered in the widely used prior art process discussed supra. That and other objects are achieved by the method of the invention which is a multi-step method with critical modifications which make it possible to avoid, or to substantially minimize, the disadvantages of the known methods.

The present method for making compositions which, while containing at least 50% by weight of isotactic polypropylene, have a high resistance to impact at temperatures of 0° C and below, comprises the first step of polymerizing propylene in an inert liquid hydrocarbon medium or diluent and in the presence of a stereospecific catalyst obtained by mixing a Ti trihalide, such as crystalline $TiCl_3$, with a dialkyl Al monohalide, such as diethyl Al Chloride, and the subsequent steps of feeding ethylene or a mixture of ethylene and propylene to the polymerization slurry obtained in first step and continuing the polymerization until the amount of polymerized ethylene is, at most, 20% of the total polymeric composition.

The present method comprises after the first propylene polymerization step at least the two subsequent steps:

A. ethylene or ethylene and propylene mixtures are fed in the polymerization slurry containing unreacted propylene from the foregoing polymerization step, in such quantities that the molar ratio between ethylene and propylene present in the polymerization system ranges from 1/99 and 40/60, preferably from 5/95 to 30/70 and the amount of copolymer formed is comprised between 3% and 8% by weight of the final polymeric composition recovered from the polymerization slurry at the end.

B. ethylene or an ethylene/propylene mixture containing at least 80% by moles of ethylene is introduced into the polymerization slurry obtained in the foregoing step A, until the resulting ethylene/propylene copolymer constitutes a quantity greater than the one obtained in the foregoing step A and comprised between 5% and 18% by weight of the final polymeric composition recovered from the polymerization slurry at the end.

Said copolymerizations carried out in accordance with (A) and (B) are the essence of the present invention and process in that they make possible composition which, although consisting for at least 50% by weight of isotactic polypropylene, nevertheless have high impact resistance at low temperatures, without any appreciable deterioration of the other valuable properties of compositions the essential constituent of which is isotactic polypropylene while, at the same time, avoiding the problems encountered with respect to heat exchange and transfer of the polymerization slurry, even when the final polymerization product has a content of combined ethylene as high as 20%.

In the practice of this invention the inert liquid hydrocarbon polymerization medium or diluent is an aliphatic, cycloaliphatic, aromatic or alkyl-substituted aromatic hydrocarbon, such as, for example, hexane, cyclohexane, heptane, xylene or the like; the stereospecific catalyst is of the Ziegler/Natta type and obtained by mixing a titanium trihalide (for example $TiCl_3$ obtained by reduction of $TiCl_4$ with Al or with organometallic compounds of Al preferably complexed with electron-donor compounds) with dialkyl Al monohalides (for example $(C_2H_5)_2AlCl$).

Step (1) of the process is generally carried out in the presence of hydrogen as molecular weight regulator.

A presently preferred embodiment of the process comprises the following operations:

(a) producing isotactic polypropylene by polymerizing propylene in a hydrocarbon solvent (e.g., heptane) at a temperature of from 50° C to 80° C and at a pressure between 3 and 10 kg/cm² gauge, in the presence of hydrogen as molecular weight modifier, and of a catalyst obtained by mixing $TiCl_3$ (or $TiCl_3$ complexed with electron-donors) with $(C_2H_5)_2AlCl$; a suspension of substantially isotactic polypropylene in the hydrocarbon solvent is thus obtained (and referred to herein as the polymerization slurry of the first step);

(b) regulation of the propylene concentration in the slurry, generally by reducing the pressure to even lower than 0.2 kg/cm² gauge (flashing) and, preferably but not necessarily, raising the temperature of the system;

(c) introduction of ethylene into the propylene containing slurry, in an amount such as to obtain a molar ratio of the fed ethylene to propylene existing in the system of from 1/99 to 40/60, allowing the mixture of the two monomers to polymerize at a temperature of from 60° C to 80° C and at a pressure generally lower than 10 kg/cm² gauge and usually comprised between 0.2 and 2.0 kg/cm² gauge, until the resulting ethylene/propylene copolymer constitutes 3% to 8%, preferably 4% to 6% by weight of the total polymeric composition and finally, (d) introducing into the polymerization slurry of (c) ethylene or an ethylene/propylene mixture very rich in ethylene and preferably containing more than 80% by moles of ethylene, allowing such mixtures to polymerize at a temperature of from 60° C to 80° C and at a pressure generally lower than 10 kg/cm² gauge, usually comprised between 0.2 and 2.0 kg/cm² gauge, until the resulting ethylene/propylene copolymer constitutes a quantity larger than the one obtained in the foregoing step (c).

According to an equally advantageous alternative procedure, steps (c) and (d) or (d) only, may be substituted by alternative step:

(c') which comprises a plurality of copolymerization steps, the first of which being of the type (c) and the subsequent ones of type (d), which are carried out by feeding to the polymerization slurry ethylene continuously and propylene discontinuously, so as to obtain, during the propylene feeding, a molar ratio of ethylene to propylene comprised between 60/40 and 85/15 and in the feed as a whole a molar ratio of at least 80/20 between the total amount of ethylene fed and the total amount of propylene fed; both monomers are polymerized at a temperature of from 60° C to 80° C and at a pressure generally lower than 10 kg/cm² gauge, usually between 0.2 and 2.0 kg/cm² gauge, until the resulting copolymer makes up 8% to 18%, preferably more than 10% by weight of the total composition.

After the above described operations (a), (b), (c), (d) and (c'), the catalyst is deactivated, if necessary, by the addition of lower aliphatic alcohols and washed. Thereafter, the polymeric material is separated from the hydrocarbon solvent and the resulting polypropylene composition is dried.

Operations (a) to (d) and (c') may be carried out in one reactor or in more than one reactor. In the latter case, the production is isotactic polypropylene [operation (a)] occurs in a reactor (primary reactor) and operations (b), the propylene concentration regulation, and (c), ethylene feeding, occur in a flashing apparatus that is an apparatus suitable for a quick evaporation of volatile compounds. Finally, operation (d) or (c') is conducted in another reactor (secondary reactor).

Transfer of the polymerization slurry from one reactor to another can be effected without difficulty by using the systems known to those skilled in the art. Furthermore, it is particularly easy to secure effective thermal control of the polymerization reactions during all operations of the process. In practice, the present process can be carried out continuously without having to use very complicated and expensive devices for the transfer of the slurries or having to stop the reactors for assuring thermal control of the polymerization reactions.

The polypropylene compositions obtained by the process of this invention exhibit melt index values (g/10') comprised between 0.1 and 10 and have a number of excellent characteristics, in particular:

modulus of elasticity to flexure comprised between 7500 and 13,000 kg/cm;

embrittlement temperature comprised between −15° and −60° C;

resilience at 0° C comprised between 5 and 20 kg.cm/cm; and transition temperature D/F comprised between 0° C and −50° C.

The following examples are given to illustrate the essential features of the invention, and are not intended to be limiting.

EXAMPLE 1

This example illustrates the preparation of polypropylene compositions according to a continuous process comprising, in the order given, operations (a), (b), (c) and (d) as defined hereinabove. The operating conditions for each single step are described hereinafter.

Operation (a)

A 4 m³ (primary) reactor was continuously fed with:

| | |
|---|---|
| hydrocarbon solvent (technical heptane) | - 250 l/hour |
| polymerizaton catalyst 3 $TiCl_3 \cdot AlCl_3$ obtained from $TiCl_4$ by reduction with aluminum and successive activation by dry-grinding, complexed with methyl benzoate (MB); $TiCl_3$/MB molar ratio = 0.1) in the form of heptane solution containing 7 g/l of $TiCl_3$ | - 40 l/hour |
| molecular weight regulator: hydrogen | - 120 l/hour |
| propylene | - 150 kg/hour |
| The reaction conditions were: | |
| temperature | - 60° C |
| manometric pressure | - 5-6 kg/cm² gauge |
| residence time (average) | - 4 hours. |

By operating as described hereinabove, it was possible to obtain 136 kg/hour of substantially isotactic polypropylene, suspended in the hydrocarbon solvent, that contained still active catalyst and unreacted propylene. This suspension, referred to, for simplicity, as polymerization slurry, was continuously discharged and transferred to the subsequent step, at the rate of 455 l/hour.

Operation (b)

The polymerization slurry amounting to 455 l was transferred to another reactor (flashing apparatus) of 1.8 m³, by pressure difference (from 5-6 kg/cm² g in the primary reactor to 0.2 kg/cm² g in the flashing apparatus), bringing the temperature to 70° C and allowing the unreacted propylene in excess to flash; a propylene-saturated slurry (at the pressure and temperature indicated hereinabove) containing about 3.75 kg/1000 l of propylene was thus obtained.

Operation (c)

The flashing apparatus was fed with 150 l/h of technical heptane and with 1 kg/h of ethylene so as to obtain an ethylene/propylene molar ratio equal to 25/75, whereupon the monomeric mixture was polymerized at a temperature of 70° C, at a pressure of 0.2 kg/cm$^2$g and with a residence time in the flashing apparatus of 1 hour.

A rubbery copolymer in an amount of 5.5 kg/h corresponding to 3.4% by weight of the final polymeric composition, was thus produced.

Operation (d)

The polymerization slurry of (c) was transferred by means of pumps to another reactor (secondary) of 1.5 m$^3$, into which an ethylene/propylene mixture in a molar ratio of 97/3, corresponding to a feeding of 30 kg/h of ethylene and of 1.86 kg/h of propylene, was introduced; the whole was allowed to polymerize at a temperature of 70° C, at a pressure of 0.7 kg/cm$^2$g, with an average residence time of 2 hours. By this procedure, a crystalline copolymer containing a high percentage of ethylene was produced in an amount of 29.9 kg/h corresponding to 18.4% by weight of the final polymeric composition. Still operating continuously the polymerization slurry of the secondary reactor was transferred at first into a reactor wherein it was treated at 85° C with n-butanol, in order to deactivate the catalyst, then subjected to washing with water, centrifuged at 50° C and dried at a maximum temperature of 125° C.

The recovered polymeric product amounted to 162 kg/h, whereas about 9.4 kg/h amorphous polymeric product remained in the polymerization solvent.

The resulting polypropylene composition having a final content of combined ethylene equal to 12% by weight, exhibited the following physical-chemical and technical characteristics:

|  |  |  |
|---|---|---|
| melt index | (g/10') | 0.5 |
| melting point | °C | 172 |
| elasticity modulus | kg/cm$^2$ | 8,000 |
| resilience | kg.cm/cm | 11.8 |
| embrittlement temp. | °C | −55 |
| Tensile test: |  |  |
| max. tensile strength | kg/cm$^2$ | 260 |
| elongation | % | 570 |
| yield strength | kg/cm$^2$ | 234 |
| transition temp. DF | °C | −25.5 |
| viscosity | dl/g | 3.4 |

This test for preparing polypropylene compositions was conducted continuously for 44 days without meeting with any difficulties regarding the heat exchange and the transfer of the slurry from one reactor to another.

By way of comparison, the test was repeated, but without operation (c), i.e., without the feeding of ethylene into the flashing apparatus. In this case, a polymeric product exhibiting characteristics similar to those of the product according to this invention was obtained, but, due to troubles with respect to the heat exchange and slurry transfer, the reactor run had to be stopped after about 24 hours.

EXAMPLE 2

This example illustrates the preparation of polypropylene compositions according to a continuous process comprising in the order given, operations (a), (b), (c) and (c') as described hereinabove. The operating conditions in the primary reactor and in the flashing apparatus — operations (a), (b) and (c) and the mass flow per hour were the same as in Example 1. Operation (d) was replaced by (c'), during which ethylene was fed in continuously and propylene was fed in discontinuously.

The polymerization slurry of (c) was transferred by means of pumps into another 1.5 m$^3$ reactor (secondary), to which ethylene was fed continuously at a rate of 22 kg/h and propylene was fed discontinuously, operating at a temperature of 70° C and at a pressure of 0.7 - 1 kg/cm$^2$ g, with an average residence time of 2 hours. More particularly in a first test, A, an ethylene/propylene mixture having a molar ratio = 80/20 (that is 22 Kg/h ethylene and 8.27 kg/h propylene) was fed in first for 10 minutes, then ethylene alone was fed in for 20 minutes, after which an ethylene/propylene mixture (80/20) was fed in for another 10 minutes and finally ethylene alone for 20 minutes, repeating this type of feeding for all the time required for test A.

In a second test, B, the type of hourly feeding was similar to that of test A, the only difference consisting in that, during the propylene feeding, the ethylene/propylene molar ratio was 70/30 instead of 80/20.

In test A, the ethylene/propylene total molar ratio was 92.5/7.5, while in test B it was 88/12.

Unlike the preceding example, in operation (c') of this Example a predominantly rubbery copolymer was formed during the feeding of propylene, and a predominantly crystalline copolymer was formed during the feeding of ethylene only.

By operating successively according to example 1, polypropylene compositions were obtained having contents of combined total ethylene, of isotactic polypropylene, of rubbery and crystalline copolymer as specified below:

|  |  | Test A | Test B |
|---|---|---|---|
| Content of substantially isotactic polypropylene, | % by weight | 80.8 | 79.8 |
| total content of combined ethylene, | % by weight | 12.0 | 9.9 |
| rubbery copolymer operation (c) | % by weight | 4.3 | 4.3 |
| rubbery copolymer operation (c') | % by weight | 6.1 | 7.2 |
| crystalline copolymer operation (c') | % by weight | 8.8 | 8.7 |

The physical-mechanical and thermal characteristics of the two polypropylene compositions are listed below:

|  |  | Test A | Test B |
|---|---|---|---|
| melt index | g/10' | 0.93 | 1.8 |
| melting point | °C | 169 | 168 |
| elasticity modulus | kg/cm$^2$ | 8100 | 9500 |
| resilience (at 0° C) | kg.cm/cm | 10.9 | 7.9 |
| embrittlement temp. | °C | −40.5 | −21.5 |
| Tensile test: |  |  |  |
| max. tensile strength | kg/cm$^2$ | 260 | 266 |
| elongation | % | 650 | 766 |
| yield strength | kg/cm$^2$ | 260 | 270 |
| transition temp. DF | °C | −12.5 | −7 |
| viscosity |  | 3 | 2.7 |

Tests A and B were conducted continuously for a time-period of 44 days without encountering any difficulty.

By way of comparison, tests A and B were repeated, but replacing (c') with (d), during which ethylene and propylene were fed continuously in molar ratios equal to those found on the whole in (c') of tests A and B according to this invention.

In both comparison tests, polymeric products were obtained exhibiting properties analogous with those of the products of tests A and B, but, owing to troubles with the heat exchange and slurry transfer, the reactors run had to be stopped after about 30 hours.

EXAMPLE 3

This example illustrates five preparation tests of polypropylene compositions employing operations, (a), (b), (c) and (d) as defined herein, all conducted in the same reactor. To such purpose, a 20 l reactor was charged with:

- 3 $TiCl_3.AlCl_3$: 8.0 g
- $Al(C_2H_5)_2Cl$: 16.0 g
- technical heptane: 10 l
- propylene: up to 4 $kg/cm^2$ g.

The reactor was maintained at 65° C and in a time of 1.5 hours 2.5 kg of substantially isotactic polypropylene were obtained [operation (a)]. The isotacticity index of the polypropylene was between 90 and 93.5, depending on the tests. The pressure in the reactor was successively reduced to 1 $kg/cm^2$ g., thus obtaining a propylene-saturated (130 g) polymerization slurry [operation (b)]; then ethylene was fed in, propylene copolymerized with ethylene and the pressure dropped to 0.5 $kg/cm^2$. Subsequently, by feeding in additional ethylene, the pressure was brought again to 1 $kg/cm^2$ g, allowing the ethylene/propylene mixture to polymerize [operation (c)]; finally ethylene/propylene mixtures very rich in ethylene (at least 90% by moles) were continuously fed in and allowed to polymerize in the reaction slurry. At the conclusion of the polymerization the catalyst was deactivated and the polypropylene composition thus obtained was separated and purified as described in Example 1.

The following Table I gives the characteristics of the polypropylene compositions obtained as a function of the operating conditions in (c) and (d) and of the polypropylene type (isotacticity index) produced in operation (a).

TABLE I

|  | Test 1 | Test 2 | Test 3 | Test 4 | Test 5 |
|---|---|---|---|---|---|
| Operation (a) | | | | | |
| Isotacticity index: % | 93.5 | 93.5 | 90.5 | 92 | 90 |
| Operation (c) | | | | | |
| Residual propylene: g | 130 | 130 | 130 | 130 | 130 |
| Ethylene fed: g | 10 | 10 | 30 | 10 | 10 |
| Ethylene/propylene molar ratio: | 10/90 | 10/90 | 25/75 | 10/90 | 10/90 |
| Operation (d) | | | | | |
| Ethylene fed: g | 450 | 450 | 450 | 450 | 450 |
| Propylene fed: g | 50 | 20 | 70 | 50 | 20 |
| Ethylene/propylene molar ratio: | 94/6 | 97/3 | 90/10 | 94/6 | 97/3 |
| Ethylene final content: % by weight | 14.9 | 17.5 | 11 | 10.4 | 12.5 |
| Melt flow index: g/10' | 0.57 | 0.45 | 3.5 | 2.4 | 1.9 |
| Embrittlement temperature: ° C | −43 | −41 | −44 | −34 | −28 |
| Flexural rigidity $kg/m^2$ | 11,100 | 11,050 | 10,400 | 11,050 | 11,750 |
| Resilience at 0° C kg.cm/cm | 9.2 | 8.2 | 8.8 | 8.2 | 8.0 |
| Tensile tests | | | | | |
| Max. tensile strength: $kg/cm^2$ | 302 | 304 | 257 | 280 | 268 |
| Elongation at break: % | 240 | 161 | 660 | 690 | 490 |
| Yield stress: $kg/cm^2$ | 302 | 304 | 257 | 280 | 268 |

EXAMPLE 4

This example illustrates the preparation of the polypropylene compositions by a continuous process that comprises, in the order given, operation (a), (b) and (c') as defined herein. The operating conditions for (a) and (b) were the same as in Example 1: in (c') the temperature was 70° C, the pressure was 0.7 - 1 $kg/cm^2$ gauge and owing to the volume of the reactor (secondary) the average residence time was 2 hours. The feeding modalities of ethylene and propylene during (c') and the characteristics of the polypropylene compositions thus obtained are reported in Tables II and III.

TABLE II

| FEEDING MODALITIES | | TEST 1 | TEST 2 | TEST 3 | TEST 4 | TEST 5 | TEST 6 | TEST 7 | TEST 8 | TEST 9 |
|---|---|---|---|---|---|---|---|---|---|---|
| Ethylene | kg/h | 18 | 18 | 18 | 18 | 18 | 18 | 18 | 22 | 30 |
| Propylene | " | 4.8 | 2.4 | 3.36 | 3 | 3.84 | 4.8 | 4.45 | 4.70 | 4 |
| Ethylene/propylene total molar ratio | | 85/15 | 92/8 | 89/11 | 90/10 | 87.5/12.5 | 85/15 | 86/14 | 87.5/12.5 | 92/8 |
| Ethylene/propylene molar ratio during propylene feeding | | 65/35 | 65/35 | 65/35 | 75/25 | 70/30 | 65/35 | 85/15 | 70/30 | 75/25 − 96/4 |
| 0-5 feeding | minutes | E+P | E+P | E+P (7') | E+P | E+P | E+P | E+P | E+P | E+P (75/25) |
| 5-10 feeding | " | E+P | E | E | E+P | E | E | E+P | E+P | E+P (75/25) |
| 10-15 feeding | " | E | E | E | E | E | E | E+P | E | E+P (96/4) |
| 15-20 feeding | " | E | E | E | E | E+P | E+P | E+P | E | E+P (96/4) |
| 20-25 feeding | " | E | E | E | E | E | E | E+P | E | E+P (96/4) |
| 25-30 feeding | " | E | E | E | E | E | E | E | E | E+P (96/4) |
| 30-35 feeding | " | E+P | E+P | E+P (37') | E+P | E+P | E+P | E+P | E+P | E+P (96/4) |
| 35-40 feeding | " | E+P | E | E | E+P | E | E | E+P | E+P | E+P (96/4) |
| 40-45 feeding | " | E | E | E | E | E | E | E+P | E | E+P (96/4) |
| 50-55 feeding | " | E | E | E | E | E | E | E+P | E | E+P (96/4) |
| 55-60 feeding | " | E | E | E | E | E | E | E | E | E+P (96/4) |
| Isotactic polypropylene | % by weight | 85.5 | 86.6 | 86.3 | 86.4 | 86.0 | 85.5 | 85.6 | 83.4 | 79.8 |
| Rubbery copolymer | % by weight | 6.9 | 3.7 | 4.8 | 5.8 | 6.3 | 6.9 | | 7.5 | 4.4 |
| Crystalline copolymer | % by weight | 7.6 | 9.7 | 8.9 | 7.8 | 7.7 | 7.6 | | 9.1 | 15.8 |
| Total ethylene content | % by weight | 10.5 | 8.2 | 9.6 | 9.0 | 8.9 | 8.9 | 8.5 | 12.8 | 13.2 |

E = ethylene
P = propylene

TABLE III

| CHARACTERISTICS | | TEST 1 | TEST 2 | TEST 3 | TEST 4 | TEST 5 | TEST 6 | TEST 7 | TEST 8 | TEST 9 |
|---|---|---|---|---|---|---|---|---|---|---|
| MELT INDEX | g/10' | 0.72 | 0.86 | 1.1 | 1.6 | 3.2 | 2.1 | 2.6 | 1.7 | 0.7 |

TABLE III-continued

| CHARACTERISTICS | | TEST 1 | TEST 2 | TEST 3 | TEST 4 | TEST 5 | TEST 6 | TEST 7 | TEST 8 | TEST 9 |
|---|---|---|---|---|---|---|---|---|---|---|
| MELTING POINT | °C | 168 | 167 | 166 | 166 | 166 | 170 | 171 | 170 | 172 |
| ELASTICITY MODULUS | kg/cm$^2$ | 8500 | 12100 | 10300 | 10000 | 10500 | 9700 | 10000 | 9900 | 7600 |
| RESILIENCE | kg.cm/cm | 10.5 | 5.5 | 6.3 | 7.6 | 6.7 | 6.6 | 7.3 | 8.8 | 12.5 |
| EMBRITTLEMENT TEMP. | °C | −32.5 | −23 | −37.5 | −37.5 | −34.5 | −27 | −36 | −36.5 | −49 |
| TENSILE TESTS | | | | | | | | | | |
| MAX. TENSILE STRENGTH | kg/cm$^2$ | 280 | 320 | 290 | 254 | 283 | 276 | 263 | 260 | 234 |
| ELONGATION | % | 600 | 410 | 670 | 720 | 693 | 808 | 590 | 708 | 545 |
| YIELD STRENGTH | kg/cm$^2$ | 280 | 320 | — | 290 | — | — | 239 | 260 | 254 |
| TRANSITION TEMP. | °C | −12.0 | −6 | −0.5 | −1 | −6.5 | −5.5 | −9.5 | −11.5 | −27 |
| VISCOSITY | | 3.2 | 2.7 | 2.7 | 2.8 | 2.5 | 2.7 | 2.7 | 2.8 | 3.6 |

Tests 1 to 9 were conducted continuously for a 44-day period without meeting with any difficulty. Test 9 was repeated for comparative purposes, but replacing (c') with a (d) in which ethylene and propylene were fed continuously in molar ratios equal to those generally used in (c') of test 9 according to the present invention.

In the comparative test, a polymeric material was obtained exhibiting characteristics rather similar to those of the product of test 9 but, due to troubles with heat exchange and slurry transfer, the run of the reactors had to be stopped after about 30 hours.

We claim:

1. Process for preparing polymeric compositions containing at least 50% by weight of isotactic polypropylene comprising the following steps:
   (a) polymerizing propylene to isotactic polypropylene by polymerizing propylene in a hydrocarbon solvent at a temperature of from 50° C to 80° C and at a pressure between 3 and 10 kg/cm$^2$ gauge, in the presence of hydrogen and of a stereospecific catalyst comprising the product obtained by mixing a titanium trihalide with a dialkyl aluminum monohalide, to obtain a suspension of substantially isotactic polypropylene in the hydrocarbon solvent;
   (b) feeding ethylene continuously into the polymerization suspension while feeding propylene discontinuously into the suspension to obtain, during the propylene feeding, a molar ratio of ethylene to propylene of from 60/40 to 85/15 and, in the feed as a whole, a molar ratio of at least 80/20 between the total amount of ethylene fed and the total amount of propylene fed, both monomers being polymerized at a temperature of from 60° C to 80° C and at a pressure lower than 10 kg/cm$^2$ gauge, until the resulting copolymer makes up from 8% to 18% by weight of the total composition.

* * * * *